United States Patent [19]

Kiendl

[11] Patent Number: 4,779,826

[45] Date of Patent: Oct. 25, 1988

[54] MOUNTING DEVICE FOR SPACECRAFT

[75] Inventor: Helmut Kiendl, Munich, Fed. Rep. of Germany

[73] Assignee: Messerschmitt-Boelkow-Blohm Gesellschaft mit beschraenkter Haftung, Munich, Fed. Rep. of Germany

[21] Appl. No.: 46,993

[22] Filed: May 5, 1987

[30] Foreign Application Priority Data

May 6, 1986 [DE] Fed. Rep. of Germany ....... 3615263

[51] Int. Cl.4 .............................................. B64G 1/44
[52] U.S. Cl. ..................................... 244/173; 410/31; 410/38
[58] Field of Search ............... 244/173, 158 R; 410/2, 410/31-34, 38

[56] References Cited

U.S. PATENT DOCUMENTS 4,426,053 1/1984 Chenin et al. .

FOREIGN PATENT DOCUMENTS 121959 10/1984 European Pat. Off. .
3106099 10/1982 Fed. Rep. of Germany ...... 244/173
3042923 9/1985 Fed. Rep. of Germany .

Primary Examiner—Galen Barefoot
Attorney, Agent, or Firm—W. G. Fasse; D. H. Kane, Jr.

[57] ABSTRACT

The panel sections of a solar collector, for example of a spacecraft, are held or mounted in a folded down condition at least during launching and until they are unfolded. For this purpose a hold down device that must be released for the unfolding, is used. The device includes a piece of flexible rope or cable, one end of which is connected to the spacecraft body, while the other end is connected to the outermost panel section to hold all panel sections in the folded condition against forces tending to unfold the panel sections, until the rope or cable is severed by a severing mechanism. The effective cable length is adjustable and an elastic member is so arranged that it can dampen shocks and compensate for different temperature responsive expansions of the rope or cable and of the collector structure.

9 Claims, 1 Drawing Sheet

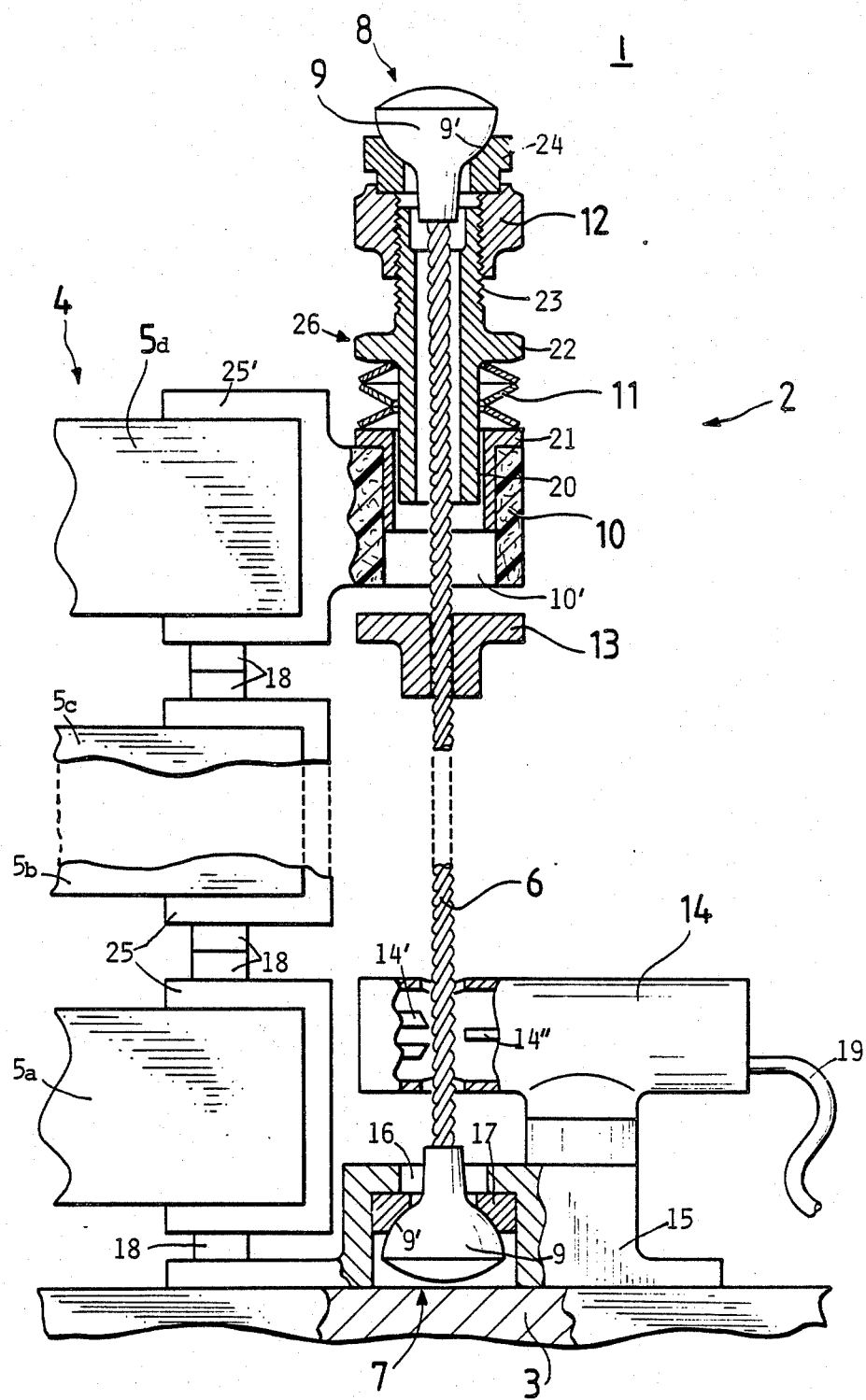

MOUNTING DEVICE FOR SPACECRAFT

FIELD OF THE INVENTION

The invention relates to a mounting device for spacecraft. More specifically, the invention relates to a hold down mounting device for temporarily holding foldable structures, such as solar collector panel sections or antennas, in a folded condition, for example on a spacecraft or satellite.

DESCRIPTION OF THE PRIOR ART

Such hold down devices conventionally employ a tension loaded cable or rope. German Patent Publication (DE-PS) No. 3,042,923 describes such a device. In the known device each individual hold down member comprises two ropes or cables of equal length, the ends of which are interconnected by a yoke-type crossbar. One connection between the rope or cable and the panel structure includes a hold down head rigidly secured to the outermost panel section of a solar collector. The second connection between the rope or cable and the space flight body is provided by a release mechanism which is releasably hooked to the body of the spacecraft. After the release, the ropes or cables are rolled up by spring tapes connected to the ropes or cables. The rolled up ropes or cables remain secured to the solar collector panels. Generally, a plurality of such hold down members are required for holding the folded panels of the solar collector in a folded down condition until release is intended. Thus, all of these hold down members must be operated in unison which means that the release mechanisms, or rather the drive for these release mechanisms must be coupled to one another for an operation in synchronism with each other. Such a structure requires a relatively large number of parts, especially movable parts. Additionally, the mechanically involved, and hence costly construction of the release mechanism makes such a device relatively heavy, expensive, and trouble-prone.

European Patent Publication (EP-OS) No. 0,121,959 and U.S. Pat. No. 4,426,053 disclose systems in which the unfoldable structures are installed in box type containers, whereby the release is accomplished by opening a box cover. Initially, the box and its cover are interconnected by a plurality of U-shaped metal strips which are either glued or welded to the box and cover. The free legs of these U-shaped strips are secured to a common rope or cable. One end of the rope is rigidly secured to the box while the other end of the cable is biased by a tension spring. A cutting mechanism, for example, in the form of a pyrotechnically or electrically operated rope or cable cutter is arranged near the fixed rope or cable end. The cutter severs the tensioned rope or cable when necessary. The spring force effective on the rope or cable tears off the U-shaped metal strips from their connecting points on the box and cover, whereby the cover can automatically open to permit the unfolding of the panel section structure. The installation of the hold down structure in a closed container or box makes this type of structure relatively heavy, expensive, involved, and space consuming. All these disadvantages are undesirable in connection with spacecraft. The rope or cable itself in the prior art is not used as a mechanical mounting element, or rather hold down element, rather it is used merely as a release element. If the U-shaped connecting strips are not completely pulled off, for example when the strips break, it is possible that the cover cannot open automatically, whereby the entire system fails.

OBJECTS OF THE INVENTION

In view of the foregoing it is the aim of the invention to achieve the following objects singly or in combination:

to construct the hold down mechanism as simple and as lightweight as possible while still assuring a reliable hold down and a reliable release;

to use a rope or cable itself as the main element in the hold down mechanism;

to provide for an adjustability of the tensile stress applied to the tensile member when it holds down the folded structure; and to compensate for different temperature expansions or contractions in the panel structure and the hold down mechanism.

SUMMARY OF THE INVENTION

The mounting structure according to the invention combines the following features. A tensile member, such as a rope or cable is connected with one end to a carrier body, such as the body of a spacecraft while the other end of the tensile member is connected with an outer end of a folded structure of a plurality of panels, such as solar or antenna panels, whereby the outer end of the tensile member is connected to the outer panel section. The connection is accomplished by a respective anchoring element. At least one controllable release mechanism in the form of a cutter for severing the tensile member is arranged intermediate the anchoring elements. An adjustment mechanism is provided for changing the effective length of the tensile member. An elastic intermediate member is arranged to dampen any shocks or impacts to which the tensile member may be exposed and to simultaneously compensate for different dimensional changes in the hold down or mounting structure and in the panel structure. Thus, the elastic intermediate mmember performs simultaneously two functions.

According to the invention each individual hold down or mounting device comprises as its main element only the tensile member, such as a rope or cable exposed to tensile stress, and at least one cutting mechanism for the severing. The cutting mechanism itself replaces the conventional heavy and trouble-prone release mechanism, thereby serving as the release mechanism of the hold down or mounting device which needs to be released but once. For safety reasons the cutting mechanism may be provided redundantly.

The elastic intermediate member such as a stack of cup springs performs two functions, namely to dampen load peaks, and to compensate different dimensional changes that may take place due to the large temperature differences between the earth and outer space. Further, the adjustment means make it possible to vary the effective length of the tensile member to thereby compensate, for example, for manufacturing tolerances and for adjusting and maintaining a defined tensile stress for holding down the panel structure.

Thus, the combination of the above features provides a hold down or mounting device which is especially lightweight and simple and which may, for example, be triggered through an electric circuit. First, one group of hold down devices may be released, for example, for a partial unfolding of the panel structure and then another group of such hold devices may be released to initiate a complete unfolding.

The mentioned cup springs acting as the elastic intermediate member have the advantage that their spring force does not vary much as a function of the spring displacement, whereby the tensile stress in the tensile member remains substantially constant and so does the hold down force. The adjustment member for adjusting the effective length of the tensile member is preferably located on the outside to provide for a good accessibility.

An explosive charge may be used to operate the rope or cable cutter. These charges provide a high cutting force while having a small mass. The additional advantage of such explosive charges is the ease with which their triggering may be controlled through a simple electrical cable connecting the charge to a central control unit.

A stop element, for example, in the form of a clamping bushing secured to the tensile member, will prevent an uncontrolled removal of the severed end of the tensile member and all components still connected to the severed end of the tensile member such as the respective anchoring element and the elastic intermediate member and the adjustment means. By holding the severed end with the respective components in place after severing, it is assured that these components cannot interfere with the unfolding operation and also cannot damage the panel structure.

By using a steel cable for the tensile member, one obtains a cost effective, high strength material which is dimensionally stable over a wide temperature range and which does not creep, as compared to synthetic fibers, but fiber cables may also be used.

BRIEF DESCRIPTION OF THE DRAWING

In order that the invention may be clearly understood, it will now be described, by way of example, with reference to the accompanying drawing, wherein the single FIGURE shows an embodiment of the present mounting or hold down device, partially in section, as used for holding down a panel structure, for example, including a plurality of solar collector panel sections.

DETAILED DESCRIPTION OF A PREFERRED EXAMPLE EMBODIMENT AND OF THE BEST MODE OF THE INVENTION

The single FIGURE shows only one hold down device. However, a plurality of such devices will normally be used and these devices are all identical to each other since they are all of the same construction, except for different cable lengths.

The hold down or mounting device 1 comprises a hold down member 2 secured to the housing 3 of a carrier body such as a satellite or spacecraft. Panel sections or rather a plurality of panel sections 5a, 5b, 5c, 5d . . . form a panel structure, for example, forming a solar collector or an antenna. Only the free ends, or rather the hold down ends, of the panel sections are shown. The opposite ends are connected by hinging means to form an unfoldable structure. The hold down ends of the panel sections are properly spaced from each other by hold down brackets 25 and spacer elements 18. The outermost panel section 5d has a spacer bracket 25' to be described in more detail below.

Incidentally, the term "outermost" and "innermost" as used herein have reference to the carrier body 3. Thus, the panel 5a is an innermost panel while the panel 5d is an outermost panel since it is further away from the carrier body 3 than the innermost panel. One or more intermediate panels may be located between these innermost and outermost panels.

In a structure in which a complete unfolding is initially intended all the hold down or mounting members 2 would be connected to the outermost panel 5d. However, where initially only a partial unfolding is intended, there would be two groups of hold down members 2. One group would be connected to an outer or outermost panel and that group of hold down members 2 would be released first. Another group of hold down members would be connected to that group of panel sections that are to be released after an initial partial unfoldng. Each hold down member 2 according to the invention comprises a first mounting means, for example, in the form of a bracket 15 conventionally connected to the carrier body 3. Second mounting means, for example, in the form of a mounting extension 10 forming part of the spacer bracket 25' of the outermost panel 5d, is located in alignment with the bracket 15. The mounting extension 10 comprises a bore 10'. First anchoring means 7 are anchored in the bracket 15 and rigidly secured to a lower end of the tensile member 6 such as a steel cable. The other end of the cable 6 is anchored by second anchoring means 8 to the mounting extension 10 forming the second mounting means.

A cutter 14, for example a pyrotechnically operated cutter is mounted on the bracket 15 for severing the cable 6 with cutting edges 14' which become effective when a punch 14" moves the cable 6 against the cutting edges 14' in response to the explosion of a charge inside the cutter 14. The charge is, for example, triggered by an electric signal supplied through an electrical conductor 19. For the intended use, the cable 6 needs to be released only once, and therefore, it is possible and quite simple to mechanically sever the cable as described.

Each anchoring means 7 and 8 comprises a so-called cable shoe 9 rigidly secured to the respective cable end. A washer 17 in a recess in the bracket 15 has a concave spherical surface cooperating with a respective spherical surface 9' of the lower cable shoe 9. Similarly, a washer 24 with a spherical surface cooperates with a respective spherical surface 9' of the upper cable shoe 9. As shown, the washers 17 and 24 have concave spherical surfaces facing away from each other and the cable shoes 9 have convex spherical surfaces 9' facing toward each other. However, the arrangement could also be reversed so that the cable shoes have concave spherical surfaces riding on convex washer surfaces. The just described arrangement makes sure that the cable can adjust itself into the most advantageous position if the lower and upper mounting means should not be properly aligned with each other, thereby avoiding an undesired increase in the tensile stress applied to the cable 6.

The tensile stress exerted by the cable 6 is introduced into the mounting extension 10 as a compression force effective through the adjustment nut 12 and a hollow sleeve 26 having a flange 22 bearing against the upper end of a set of elastic elements such as cup springs 11 which in turn bear with their lower end on the flange of a guide bushing 21 bearing on the mounting extension 10. The guide bushing 21 is made of metal while the mounting extension 10 as part of the spacer bracket 25' is made, for example, of fiber reinforced synthetic material. The hollow sleeve 26 has a lower end 20 guided in the guide bushing 21. The hollow sleeve 26 has a threaded upper end 23 cooperating with the adjustment nut 12 against which the washer 24 bears, thereby transmitting the tensile stress. The adjustment of the nut 12 on the threading 23 determines the effective length of the cable 6 between its anchoring points. The springs 11 dampen sudden shocks and simultaneously compensate for any dimensional changes that may result in the cable and in the mounting and panel structure due to temperature variations. Due to the spring characteristics of these cups springs 11, it is assured that even the extreme temperature difference effects between earth and outer space will be compensated and thus prevented from adversely affecting the effectiveness of the hold down cable 6. Even lateral displacements may thus be compensated and the cable stress or hold down force is also maintained approximately constant.

The adjustment of the effective cable length and thus of the hold down force should be such that the folded panel sections 5a . . . are maintained in a position relative to each other without any play under all load conditions.

A clamping member 13, such as a bushing, is rigidly secured to the cable 6, preferably just below the mounting extension 10 so that upon severing the severed cable portion with the components connected thereto, cannot escape and thus prevented from causing damage to the panel structure from getting wedged between panels.

If desired, the cutter 14 could be duplicated to make sure that the cable 6 is positively severed when a control signal arrives.

Although the invention has been described with reference to specific example embodiments, it will be appreciated that it is intended to cover all modifications and equivalents within the scope of the appended claims.

What I claim is:

1. An apparatus for holding a foldable panel section structure in a folded condition close to a carrier body until said panel section structure is to be unfolded, comprising a first mounting means connected to said carrier body, second mounting means connected to an outermost panel section of said panel sections spaced from said carrier body at a folded spacing, a flexible tensile member, first anchoring means for securing one end of said flexible tensile member to said first mounting means, second anchoring means for securing the other end of said flexible tensile member to said second mounting means, said apparatus further comprising adjustment means for varying the effective length of said flexible tensile member and elastic means arranged for damping shocks applied to said tensile member and for also compensating dimensional changes caused by temperature variations in said flexible tensile member and in said panel section structure, and cutting means mounted in a position for severing said flexible tensile member in response to a control signal, said adjustment means for varying the effective length of said flexible tensile member comprising a hollow sleeve having a flange, said flexible tensile member passing through said hollow sleeve, said shock damping elastic means comprising cup spring means bearing against said flange and one of said first and second mounting means, said adjustment means further comprising a threading on said hollow sleeve and a threaded adjustment member engaging said threading of said sleeve, one of said anchoring means bearing against said threaded adjustment member, whereby any tensile stress applied to said flexible tensile member is effective through said cup spring means on said mounting means.

2. The apparatus of claim 1, wherein said flexible tensile member is a length of rope or cable.

3. The apparatus of claim 1, wherein said second mounting means comprise a mounting extension with a through-hole, said hollow sleeve having a smooth end (20) guided in said through-hole, said tensile member passing concentrically through said hollow sleeve, through said cup spring means, and through said threaded adjustment member.

4. The apparatus of claim 1, wherein said cutting means comprise a cutting member operable once by an explosive charge for severing said tensile member.

5. The apparatus of claim 4, wherein said cutting means are mounted to said carrier body near that end of said flexible tensile member which is close to said carrier body.

6. The apparatus of claim 1, further comprising a stop element (13) rigidly connected to said flexible tensile member at a location between said cutting means and said second mounting means near said second mounting means for securing a severed end of said flexible tensile member against withdrawal from said second mounting means.

7. The apparatus of claim 1, wherein said flexible tensile member is a steel cable and wherein said first and second anchoring means comprise cable shoes rigidly clamped to said steel cable for holding said panel section structure in a folded condition as long as said steel cable is not severed.

8. The apparatus of claim 7, wherein said flexible first and second anchoring means comprise anchoring washers (17, 24) having first curved wall surfaces facing away from each other, said cable shoes having respective second curved surfaces facing toward each other and cooperating with said first curved surfaces of said anchoring washers for permitting movements between said tensile member and said first and second anchoring means.

9. The apparatus of claim 8, wherein said first curved surfaces are concave recesses in said anchoring washers and wherein said second curved surfaces are convex for slidingly fitting into said concave recesses.

* * * * *

UNITED STATES PATENT AND TRADEMARK OFFICE
CERTIFICATE OF CORRECTION

PATENT NO. : 4,779,826

DATED : October 25, 1988

INVENTOR(S) : Helmut Kiendl

It is certified that error appears in the above-identified patent and that said Letters Patent is hereby corrected as shown below:

Claim 8, line 1, (Column 6, line 43), delete "flexible"'
        line 8, (Column 6, line 50), before "tensile" insert --flexible--.

Signed and Sealed this

Twenty-eighth Day of November 1989

Attest:

JEFFREY M. SAMUELS

Attesting Officer    Acting Commissioner of Patents and Trademarks